April 1, 1947.  C. B. DALZELL  2,418,247
TUBULAR DETACHABLE FILTER
Filed March 17, 1941
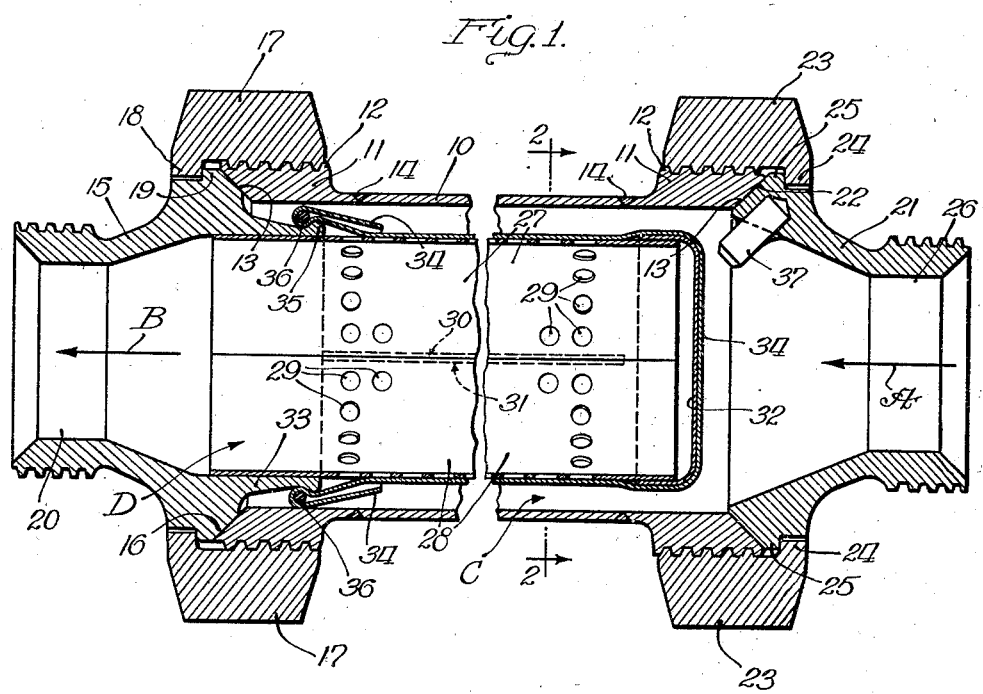
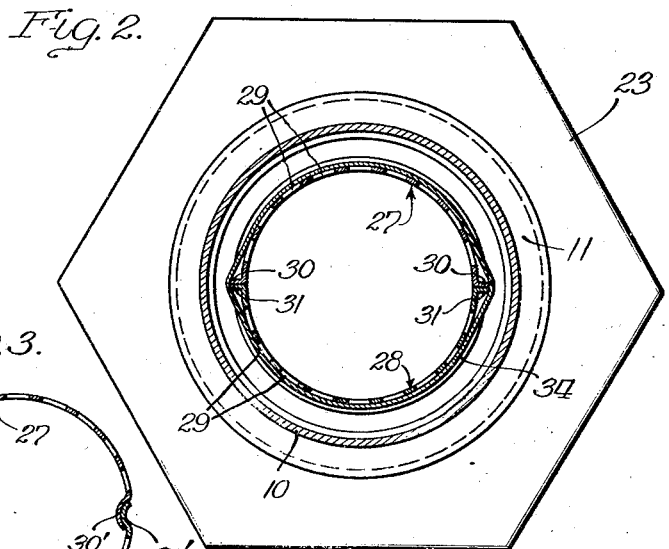
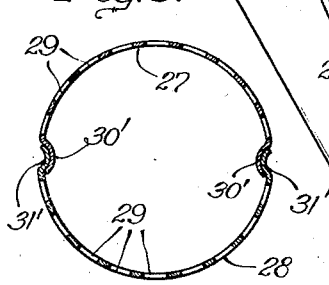
INVENTOR.
Charles B. Dalzell
BY Patented Apr. 1, 1947

2,418,247

UNITED STATES PATENT OFFICE 2,418,247

TUBULAR DETACHABLE FILTER

Charles B. Dalzell, Little Falls, N. Y., assignor to Cherry-Burrell Corporation, Chicago, Ill., a corporation of Delaware Application March 17, 1941, Serial No. 383,711

9 Claims. (Cl. 210—164)

This invention relates to new and useful improvements in filters, and more particularly to the so called pipe-line type of sanitary filters used, among other things, for the filtering of foodstuffs such, for example, as milk and other dairy products. Specifically, the invention relates to the new and novel structural features and the arrangement of the elements of the filter whereby the assembly, disassembly, cleaning and inspection are facilitated and improved, and less costly constructions are made possible.

In filters of the type contemplated by this invention employing a cloth, or the like, filter bag or envelope for the filtering of the fluid passing therethrough, it is conventional practice to provide means for supporting the filter bag or envelope in an extended form upon a perforated cartridge or other unitary frame mechanism capable of supporting the filter envelope in an extended position. In the filtering of foodstuffs, such as milk, it is, of course, essential that the filters be frequently dismantled, cleaned and inspected.

It is also essential that in such filters the filter cloth, or other suitable envelope, be adequately supported to enable its use for filtering liquids flowing under pressure without rupturing the filter material, which rupturing would likely occur if the filter material were not properly supported.

Obviously, a filter envelope support or cartridge in which the fluid passages or ports consist of numerous small apertures providing a construction satisfactory for the support of the filter cloth and for the rapid passage or flow of the fluid through said filter cloth and filter cloth support or cartridge embodies features presenting appreciable advantages. The conventional type of unitary filter cloth support or cartridge is, however, objectionable for the reason that the small apertures provided in the substantially tube-like construction which is open only at one end are not readily accessible for thorough cleaning and inspection.

The objectives of the present invention, therefore, are to provide a filter in which the elements thereof are quickly and easily assembled and disassembled; in which all of the surfaces thereof, when disassembled, are readily and easily accessible for cleaning and inspection; in which the filter bag or envelope is supported in operative position on a perforate sectional support element which may be quickly and easily assembled and disassembled, and when disassembled may be readily cleaned and inspected on all of its surfaces; in which the structural elements which are combined to form the filter have been formed in a manner to prevent the maximum amount of costly operation such as welding; and in which the filter envelope, when assembled about the filter envelope support or cartridge, tends to maintain the various sections thereof joined in operative relation with respect to one another and with respect to the filter shell or enclosure.

The foregoing objects and other important features which it is desired to cover by Letters Patent will become more apparent as the nature of the invention and structural details of the representative embodiment thereof are better understood. The organization of the elements of the invention is well set forth in the following description when read in connection with the accompanying drawings in which:

Figure 1 is a longitudinal sectional view of a filter embodying the present invention.

Figure 2 is a cross sectional view taken along line 2—2 of Figure 1.

Figure 3 is a partial sectional view showing a modified filter cartridge construction.

Referring to the figures showing the preferred embodiment of the present invention, like numerals being used to identify like elements, 10 represents a tubular or cylindrical open-ended filter enclosing element or wall. The tubular element 10 is provided at both ends with ferrules 11 having outer peripheral screw threads 12 and inwardly beveled sealing and centering faces 13. The ferrules 11 combine with the tubular element 10 to form the outer walls or shell of the filter assemblage. The ferrules 11 have inner diameters equal to the inner diameter of the tubular enclosure 10 and are affixed to the enclosure 10 in any desired manner such, for example, as by weldings as shown at 14 in Figure 1.

At one end of the filter shell formed by the combined elements 10 and 11, a round base or apertured end closure 15 is provided. The base or end closure 15 is provided with an annular outwardly beveled sealing and centering face 16 on its outer periphery for sealing and centering engagement with the complementary face 13 of the adjacent ferrule 11. The base or end closure 15 is adapted to be maintained in sealed position by the coupling nut 17. The coupling nut 17 is provided in the conventional manner with internal screw threads to engage the threads 12 on the outer periphery of the ferrule 11 which engages the end closure 15. The coupling nut 17 is also provided with an inwardly directed compression flange 18 for engaging a complementary peripheral flange 19 on the outer periphery of the end plate or closure 15.

The apertured base or end closure 15 is provided with an outwardly extending annular element 20 which constitutes the discharge port and which is provided on its outer periphery with conventional sanitary pipe coupling screw threads and is also provided at its end with an inwardly beveled sealing and centering face of conventional type to facilitate the coupling thereto of a discharge conduit for the fluid which has passed through the improved filtering device.

There is provided at the opposite or head end of the filter shell formed by the tube 10 and end ferrules 11 an apertured head end closure 21 which is similar to the base end closure 15 and is similarly provided with an annular outwardly beveled sealing and centering face 22 on its outer periphery at its inner end for engagement with the complementary face 13 of the head end ferrule 11. The base end closure or end wall 15 and the head end closure or end wall 21 are interchangeable on the ferruled ends 11 of the tube-like element 10.

The head end closure 21 is secured in position by the coupling nut 23, the internal threads of which are threaded onto the screw threads 12 of the head end ferrule 11. The coupling nut 23 is also provided with an inwardly directed compression flange 24 to engage a complementary flange 25 on the outer periphery of the end closure 21. The end closure 21 is provided with an outwardly extending annular element 26 which constitutes the supply port and which, likeunto the discharge connection 20, is provided on its outer periphery with conventional screw threads, and is also provided at its end with an inwardly beveled sealing face to facilitate the coupling thereonto of a supply conduit for supplying the fluid to be passed through the improved filtering device.

The arrows A and B of Figure 1 indicate the direction of flow of fluid through the improved filter from the supply port 26 to the discharge port 20.

A filter cloth bag or filter cloth envelope support cartridge is provided within the filter shell. The filter envelope support or cartridge, when assembled, includes a tube-like perforate-walled element comprised of two substantially semi-circular complementary, opposed, curved sections 27 and 28 provided with perforations 29. The substantially semi-circular sections 27 and 28, when assembled to form the tube-like support, are placed in abutting relation with their complementary longitudinal edges in alined abutment and the sections positioned in opposed arrangement and assembled about a common axis as clearly shown in Figure 2, and with their ends alined, as clearly shown in Figure 1. The semi-circular sections 27 and 28 are provided along the major portions of their adjacent free longitudinal edges with complementary, abutting, outwardly extending overlapping flanges 30 and 31, respectively, to facilitate the assembly thereof.

A closure cap 32 is provided for one end of the tube-like support to further aid in the assembly of the sections 27 and 28 to form the tube-like filter envelope support or cartridge, and also to further support the filter envelope. The closure cap 32 is applied to the end of the assembled sectional elements 27 and 28 by telescoping the closure cap 32 over the alined ends of said elements. The cap, when so assembled, due to its close fit tends to maintain the sections 27 and 28 in assembled order.

In Figure 3 is shown a partial sectional view of a modified construction of the elements 27 and 28. In the modified construction the curved trackways 30' and the complementary curved slides 31', which mesh with the tracks 30', have been substituted in place of the flanges 30 and 31. The curved tracks 30' and the complementary slides 31' extend along the entire longitudinal edges of the elements 27 and 28, respectively. The elements 27 and 28 in the modified construction are telescopically assembled by telescoping the slides 31' into the tracks 30'. A tubular filter cloth supporting cartridge consisting of the telescopically assembled elements 27 and 28 is made possible and provides a substantially rigid construction by the use of the modified construction including the meshing tracks and skids 30' and 31', respectively.

The tubular filter cloth support or cartridge so formed by the assembled substantially semi-circular sectional elements 27 and 28 and the closure cap 32 is upheld or carried within the filter shell formed by the tubular element 10 and the ferrules 11 by telescoping the free end of the filter cartridge into an annulus or circular flange or rib 33 extending inwardly from the base end closure 15. The annulus 33 encompasses the aperture in the base end closure 15.

The inner diameter of the annulus 33 and the outer diameter of the complementary end of the assembled elements 27 and 28 are such as to provide a close fit between these telescoped elements whereby the assembled filter cloth envelope support or cartridge is supported centrally within the filter shell. When so assembled within the filter shell, the perforate-walled filter cloth envelope support or cartridge divides the space within the filter shell into a supply compartment C comprised primarily of the annular space between the filter cartridge and the cylindrical filter shell, and a discharge compartment D comprised primarily of the space within the filter cartridge.

A filter cloth bag or envelope 34 is telescoped over the filter cartridge and drawn taut thereover. The mouth end of the filter envelope 34 overlaps the inner end of the annulus or flange 33 into which the adjoining end of the filter cartridge has been telescoped. The inner end of the annulus 33 is provided with an outer peripheral flange or rib 35. A tensioned resilient band 36 is placed about the filter bag and annulus 33 immediately behind the rib 35 to maintain the filter bag 34 in its taut position over the filter cartridge, and to press the engaged portion of the filter bag or envelope tightly against the outer surface of the annulus 33 in sealing engagement therewith, thereby preventing any ready passage of liquid from the supply compartment C into the discharge compartment D without first passing through the filter envelope 34.

The filter bag or envelope 34, as clearly shown in Figure 1, which is preferably made of cloth but which may also be made of any other suitable filter material, tends to maintain the filter cartridge formed of the assembled elements 27, 28 and 34 in their operative position within the filter shell. However, if the assembled filter cartridge tends to move axially within the filter shell toward the head end closure 21 it will engage a stud or stop 37 mounted on the inner surface of the head end closure cap 21 to limit the possible axial motion of the filter cartridge toward the inlet opening or aperture 26.

A filtering device constructed according to the herein described invention provides a simple, easily assemblable and disassemblable sanitary type of filter in which all of the parts, when assembled, are readily cleanable and inspectable on all of their surfaces. The improved construction as contemplated by this invention and as clearly shown in Figure 1 has obviated from the design of the filter, and especially from the inner surfaces thereof, all objectionable crevices, etc., in which bacteria or foreign matter may accumulate. The improved construction as shown may be quickly and easily assembled or disassembled and, as previously pointed out, various parts of the construction are interchangeable one with another whereby, when assembling the same, the several parts may be assembled in interchangeable arrangement.

Although the invention has been described in its preferred embodiment, various modifications thereof may be readily apparent to those skilled in the art.

The invention is hereby claimed as follows:

1. A filter device of the character described including a side wall forming a portion of a filter chamber, spaced openings in said chamber, an end wall for said chamber having a flange defining one of said openings, a filter material member connected to said flange, and a perforate sectional filter material member supporting device partially telescoped into said flange within said chamber so as to support said filter material member supporting device, said supporting device being comprised of complementary curved sections in opposed arrangement having abutting overlapping flanges extending along the adjacent edges of said sections to facilitate assembly of said sections into a substantially tubular element.

2. A filter envelope support comprising an annulus having an annular rib about its outer periphery adjacent one end thereof, a filter envelope, a sectional perforate tubular filter envelope supporting member having the longitudinal edges of the sections in opposed abutting arrangement and adapted to be partially telescoped into said annulus said supporting member being encased in said filter envelope, a closure cap for one end of said tubular member, and a filter envelope clamping element surrounding said annulus adjacent said rib and engaging said envelope, whereby said envelope is secured to said annulus.

3. A filter comprising, in combination, a cylindrical outer casing having spaced inlet and discharge openings, a filter envelope, a sectional perforate-walled inner substantially cylindrical filter envelope support closed at one end and having flanges along the longitudinal edges of the sections in opposed abutting arrangement, and means for supporting said sectional filter envelope support, said filter envelope support being co-axially supported within said outer cylindrical casing and communicating at its open end with said discharge opening in said outer casing, said filter material envelope being removably disposed about said inner sectional casing thereby dividing the interior of said outer casing into inlet and discharge chambers.

4. A filter of the type described comprising a substantially cylindrical enclosing shell having a removable closure including a supply connection at one end and a removable closure including a discharge connection at the other end, a perforate substantially cylindrical tubular sectional filter cartridge in said enclosing shell between said supply and discharge connections and having opposed abutting flanges along adjacent edges of the sections, and a filter envelope supported by said cartridge, said filter cartridge and said filter envelope dividing the interior of said enclosing shell into a supply chamber and a discharge chamber and being supported solely by said discharge connection out of contact with the walls of said enclosing shell.

5. In a device of the class described, a filter enclosure having spaced inlet and discharge openings, a substantially cylindrical perforate sectional filter material support within said filter enclosure, and a filter material envelope disposed about said sectional support and secured to said enclosure to divide said enclosure into supply and discharge chambers and to aid in maintaining said sections of said support in operative position with respect to one another and with respect to said enclosure, the sections of the filter material support having longitudinal edges extending axially of said support when assembled thereon and being provided with flanges along said edges adapted to abut corresponding flanges on an adjacent section.

6. A filter of the type described comprising a substantially cylindrical casing having a removable closure including a supply opening at one end and a removable closure including a discharge opening at the other end, an inwardly directed flange on the closure in which the discharge opening is located, a perforate sectional tubular substantially cylindrical filter cartridge in said casing between said closures and being supported on said inwardly directed flange encompassing said discharge opening, said filter cartridge dividing the interior of said casing into a supply chamber and a discharge chamber and being supported by said inwardly directed flange out of contact with the walls of said casing and having opposed abutting flanges along adjacent edges of the sections of said cartridge, and a filter envelope supported by said cartridge on the outside thereof and covering said cartridge and interposed between said supply and discharge chambers and secured to said inwardly directed flange.

7. A filter of the character described comprising, in combination, an enclosing shell having open ends, an apertured and flanged closure cap for one of said open ends, means for forcing said cap into sealing engagement with said shell, a sectional substantially tubular filter cartridge having an open end and a perforate wall, means on said apertured closure cap for supporting said cartridge within said shell out of contact therewith, said aperture communicating with the open end of said cartridge which is supported on said flanged closure cap, a second apertured cap for the other open end of said shell, means for forcing said second apertured cap into sealing engagement with said shell, a large-mouthed filter material envelope about said cartridge and having its mouth end encompassing the aperture in the first mentioned apertured cap, and means for securing said filter material envelope in position about said cartridge and removably attaching said envelope to said flange on said first mentioned cap.

8. In a device of the class described, an apertured base, a cylindrical open-ended shell disengageably mounted on said base, means for securing said shell to said base, an inwardly directed annular flange on said base encompassed by said shell and encompassing the aperture in said base, a perforate-walled sectional tubular filter material support having one end telescopically engaging said annular flange on said base to thereby carry said material support, said filter material support having opposed abutting flanges along adjacent edges of the sections of said support, a closure cap for the other end of said filter material support, a filter material envelope open at one end and closed at the other end disposed about said material support, clamping means clamping said envelope to said annular flange, an apertured closure for the other end of said shell, and means for securing said apertured closure to said shell.

9. The combination of an annular enclosing shell open at its ends, disengageable apertured closures for said open ends, means for tightly securing said closures to said open ends, an inwardly directed flange on one of said closures defining the aperture therein, a perforate-walled substantially tubular sectional filter material support disengageably connected to said flange on one of said closures and projecting into said shell to divide the interior of said shell into an annular chamber about said material support and a cylindrical chamber within said material support, the sections of said support being provided with opposed abutting flanges along adjacent edges thereof, a disengageable closure for one end of said material support, the other end of said material support being telescopically associated with said flange on one of the closures for the open ends of said shell, means for connecting liquid supply and discharge conduits to said apertures in the closures for said shell, and filter material disposed about the perforate wall of said support.

CHARLES B. DALZELL.

REFERENCES CITED

The following references are of record in the file of this patent:

UNITED STATES PATENTS

| Number | Name | Date |
|---|---|---|
| 254,552 | Martin | Feb. 28, 1882 |
| 864,345 | Tollefson | Aug. 27, 1907 |
| 1,048,828 | Haas | Dec. 31, 1912 |
| 1,685,775 | Dreaper | Oct. 2, 1928 |
| 1,693,741 | Wuest | Dec. 4, 1928 |
| 655,795 | Paxton | Aug. 14, 1900 |
| 982,982 | Mueller | Jan. 31, 1911 |
| 1,071,306 | Finigan | Aug. 26, 1913 |
| 1,511,726 | Heinze | Oct. 14, 1924 |
| 1,547,246 | Weaver | July 28, 1925 |
| 1,663,322 | Tekavec | Mar. 20, 1928 |
| 1,709,237 | Tekavec | Apr. 16, 1929 |
| 2,019,094 | Rice et al. | Oct. 29, 1935 |
| 1,524,916 | Demme | Feb. 3, 1925 |
| 444,483 | Breyer | Jan. 13, 1891 |

FOREIGN PATENTS

| Number | Country | Date |
|---|---|---|
| 265,856 | British | Feb. 17, 1927 |